United States Patent
Clark et al.

(10) Patent No.: US 7,859,716 B2
(45) Date of Patent: *Dec. 28, 2010

(54) OPTIMIZING TO-BE-PRINTED OBJECTS DURING PRINT JOB PROCESSING

(75) Inventors: Raymond E. Clark, Georgetown, KY (US); Robert L. Cook, Lexington, KY (US); Ning Ren, Lexington, KY (US); Martin G. Rivers, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1670 days.

This patent is subject to a terminal disclaimer.

(21) Appl. No.: 10/983,826

(22) Filed: Nov. 8, 2004

(65) Prior Publication Data
US 2005/0213145 A1    Sep. 29, 2005

Related U.S. Application Data

(63) Continuation-in-part of application No. 10/811,209, filed on Mar. 26, 2004.

(51) Int. Cl.
*G06F 15/00* (2006.01)
*G06K 9/00* (2006.01)

(52) U.S. Cl. ........................ 358/1.9; 382/100

(58) Field of Classification Search ................ 358/1.19, 358/1.1, 1.15, 1.16, 1, 18, 1.14, 1.2, 474, 358/3.16, 3.23, 406, 1.9; 345/440.1, 690, 345/589, 559, 561; 382/245, 234, 303, 100; 348/103, 472
See application file for complete search history.

(56) References Cited

U.S. PATENT DOCUMENTS

| | | |
|---|---|---|
| 5,379,129 A | 1/1995 | Othmer |
| 5,542,052 A | 7/1996 | Deutsch |
| 5,608,848 A | 3/1997 | Walker |
| 5,638,498 A | 6/1997 | Tyler et al. |
| 5,638,499 A | 6/1997 | O'Connor |
| 5,659,407 A | 8/1997 | Andresen |
| 5,734,802 A | 3/1998 | Maltz |
| 5,805,174 A | 9/1998 | Ramchandran |
| 5,841,898 A | 11/1998 | Liguori |
| 5,926,185 A | 7/1999 | Vyncke |
| 5,946,451 A | 8/1999 | Soker |
| 5,966,462 A | 10/1999 | Linder |

(Continued)

OTHER PUBLICATIONS

Non-Final Office Action for U.S. Appl. No. 12/033,944, dated Apr. 2, 2010.

(Continued)

*Primary Examiner*—Saeid Ebrahimi Dehkordy

(57) ABSTRACT

Methods for processing print jobs in rendering devices include representing multiple to-be-printed objects with fewer such objects before processing of the objects occurs. In this manner, processing and memory requirements are optimized. Examples include utilizing a single raster operation function of one object for an entirety of objects; using fewer raster operation functions than originally required for the entirety of objects; creating a no processing (NOP) situation; and effectively creating a mask. Other aspects include modifying raster operation functions of one or more objects to have fewer variables than originally specified by the print job. Printers having stored or accessible computer executable instructions for performing the steps are also disclosed as are host devices that may direct or control the printer to perform the same.

14 Claims, 15 Drawing Sheets

U.S. PATENT DOCUMENTS

| | | | |
|---|---|---|---|
| 5,978,553 A | 11/1999 | Ikeda | |
| 5,987,230 A | 11/1999 | Shimizu | |
| 6,020,897 A | 2/2000 | Carlsen | |
| 6,049,339 A | 4/2000 | Schiller | |
| 6,052,202 A | 4/2000 | Shimizu | |
| 6,257,693 B1 * | 7/2001 | Miller et al. | 347/19 |
| 6,289,364 B1 | 9/2001 | Borg | |
| 6,323,958 B1 | 11/2001 | Shimizu | |
| 6,330,072 B1 | 12/2001 | Barada | |
| 6,396,959 B1 | 5/2002 | Hamburg | |
| 6,466,210 B1 | 10/2002 | Carlsen | |
| 6,466,229 B1 | 10/2002 | Nagao | |
| 6,490,055 B1 | 12/2002 | Shimizu | |
| 6,522,427 B1 | 2/2003 | Bhattacharjya | |
| 6,532,081 B1 | 3/2003 | Cecchi | |
| 6,535,293 B1 | 3/2003 | Mitsuhashi | |
| 6,546,132 B1 | 4/2003 | Bhattacharjya | |
| 6,616,359 B1 | 9/2003 | Nakagiri et al. | |
| 6,665,094 B1 | 12/2003 | Lapstun | |
| 6,741,368 B1 | 5/2004 | Hoel | |
| 6,970,958 B2 | 11/2005 | Tohki | |
| 7,532,355 B2 | 5/2009 | Gauthier et al. | |
| 2001/0050781 A1 | 12/2001 | Kujirai | |
| 2002/0003633 A1 | 1/2002 | Matsumoto et al. | |
| 2002/0131065 A1 | 9/2002 | Sweetland | |
| 2003/0147098 A1 | 8/2003 | Gnutzmann | |
| 2003/0184804 A1 | 10/2003 | Mastie et al. | |
| 2003/0189716 A1 | 10/2003 | Tsuji et al. | |
| 2004/0008381 A1 | 1/2004 | Jacob et al. | |
| 2004/0027616 A1 | 2/2004 | Lapstun et al. | |
| 2004/0032617 A1 | 2/2004 | Lapstun et al. | |
| 2004/0036919 A1 | 2/2004 | Lpastun et al. | |
| 2004/0036920 A1 | 2/2004 | Lapstun et al. | |
| 2004/0036921 A1 | 2/2004 | Lapstun et al. | |
| 2004/0042045 A1 | 3/2004 | Lapstun et al. | |
| 2004/0042046 A1 | 3/2004 | Lapstun et al. | |
| 2004/0051903 A1 | 3/2004 | Lapstun et al. | |
| 2004/0051904 A1 | 3/2004 | Lapstun et al. | |
| 2004/0075849 A1 | 4/2004 | Jacobsen et al. | |
| 2004/0085559 A1 | 5/2004 | Danilo | |
| 2004/0095613 A1 | 5/2004 | Kuwahara | |
| 2004/0100658 A1 | 5/2004 | Kanda et al. | |
| 2004/0105106 A1 | 6/2004 | Miller et al. | |
| 2004/0109182 A1 | 6/2004 | Nagarajan et al. | |
| 2004/0114184 A1 | 6/2004 | Sugiyama | |
| 2005/0213114 A1 | 9/2005 | Clark et al. | |
| 2005/0213117 A1 | 9/2005 | Clark et al. | |
| 2005/0213119 A1 | 9/2005 | Clark et al. | |
| 2005/0213130 A1 | 9/2005 | Bender et al. | |
| 2005/0213142 A1 | 9/2005 | Clark et al. | |
| 2005/0213143 A1 * | 9/2005 | Cook et al. | 358/1.15 |
| 2008/0024810 A1 | 1/2008 | Clark et al. | |
| 2008/0137119 A1 | 6/2008 | Clark et al. | |
| 2009/0097067 A1 | 4/2009 | Cook et al. | |
| 2009/0109459 A1 | 4/2009 | Bender et al. | |

OTHER PUBLICATIONS

Non-Final Office Action for U.S. Appl. No. 10/983,390, U.S. Patent and Trademark Office, dated Mar. 4, 2009.
Notice of Allowance for U.S. Appl. No. 10/810,140, U.S. Patent and Trademark Office, dated Mar. 21, 2008.
Non-Final Office Action for U.S. Appl. No. 10/983,952, U.S. Patent and Trademark Office, dated Feb. 5, 2009.
Notice of Allowance for U.S. Appl. No. 10/810,004, U.S. Patent and Tradmark Office, dated Dec. 8, 2009.
Non-Final Office Action for U.S. Appl. No. 10/810,143, U.S. Patent and Trademark Office, dated Nov. 30, 2009.

* cited by examiner

OPTIMIZING TO-BE-PRINTED OBJECTS DURING PRINT JOB PROCESSING

This application claims benefit as a continuation-in-part of co-pending application entitled "Optimizing Raster Operation Functions During Print Job Processing," having Ser. No. 10/811,209, filed Mar. 26, 2004.

FIELD OF THE INVENTION

The present invention relates to achieving optimization during processing of print jobs in a rendering device, such as a printer. In one aspect, it relates to optimizing raster operation functions by modifying their form originally specified by the print job. In another aspect, it relates to modification according to various identities of the function variables. In still another aspect, it relates to representing multiple to-be-printed objects of print jobs with fewer such objects.

BACKGROUND OF THE INVENTION

The art of printing with rendering devices, such as laser or other printers, is relatively well known. In general, printing results by processing a print job, typically in the well known form of a printer description language (PDL), to create bitmaps that are sent to printing mechanisms to obtain hard copy outputs. Among other things, the PDL specifies a raster operation function describing how to apply pixel coloring for to-be-printed objects of the print job. Often, this function embodies a math or logic function as a Boolean expression, for example, when the PDL is of PCL language type or an algebraic expression for PDF languages. As is known, a PCL language has 256 possible logic functions while a PDF language has 16 math functions. In any raster operation function, however, sometimes the function includes a multiplicity of variables including, but not limited to, a destination variable, a to-be-printed object variable and/or an ink or coloring variable. Yet, the more variables a function has, the more processing and more memory required therefor. Accordingly, a need exists in the printing arts for achieving optimization of raster operation functions, especially for minimizing processing and memory requirements.

Appreciating that print jobs often have a multiplicity of to-be-printed objects, each with their own raster operation function, a further need exists in the printing arts to represent multiple objects in a manner that minimizes processing and memory requirements.

SUMMARY OF THE INVENTION

The above-mentioned and other problems become solved by applying the principles and teachings associated with the hereinafter described methods and apparatus for achieving optimization of raster operation functions during processing of print jobs in rendering devices, such as printers. Methods of optimizing include modifying raster operation functions to have fewer variables than originally specified by the PDL print job. Preferably, the modification occurs as a result of determining whether a variable of the function has a black or white identity, such as a black or white ink or a black or white image, stencil or character, or whether a destination variable remains unaltered in a to-be-painted area. Additionally, determining how many variables a function has and whether such is one or more may be performed before the function modification occurs. Printers having stored computer executable instructions for performing the method of the invention are also disclosed as are host devices that may direct or control the printer to perform the same.

For multiple to-be-printed objects, fewer such objects can accurately represent the entirety of objects. In some instances, this occurs by utilizing a single raster operation function of one object as representative for all of the objects. In other instances, it occurs by using fewer raster operation functions than originally required for all of the objects. In still other instances, it occurs by creating a no processing (NOP) situation. Further embodiments contemplate the effective creation of a mask. Of course, each object can have its raster operation function modified to have fewer variables than originally specified by the PDL print job. Modification can occur whenever convenient.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized and that process, electrical, mechanical and/or software changes may be made without departing from the scope of the present invention. The following detailed description is, therefore, not to be taken in a limiting sense, and the scope of the present invention is defined only by the appended claims and their equivalents. In accordance with the present invention, methods and apparatus for achieving optimization of raster operation functions during the processing of print jobs are hereinafter described.

Figure 1:
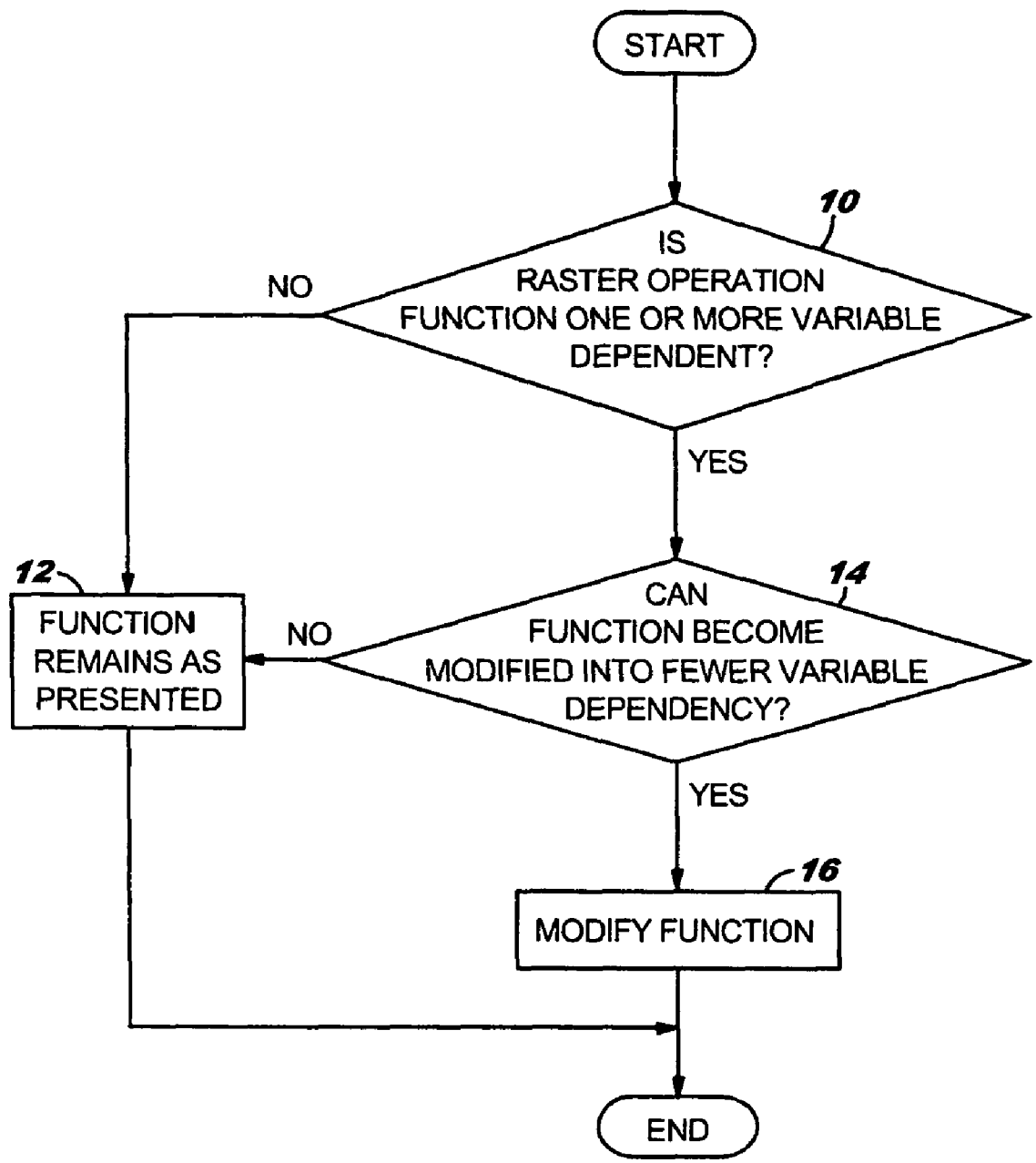
FIG. 1 is a flow chart in accordance with the teachings of the present invention for optimizing a raster operation function if possible.
Figure 2:
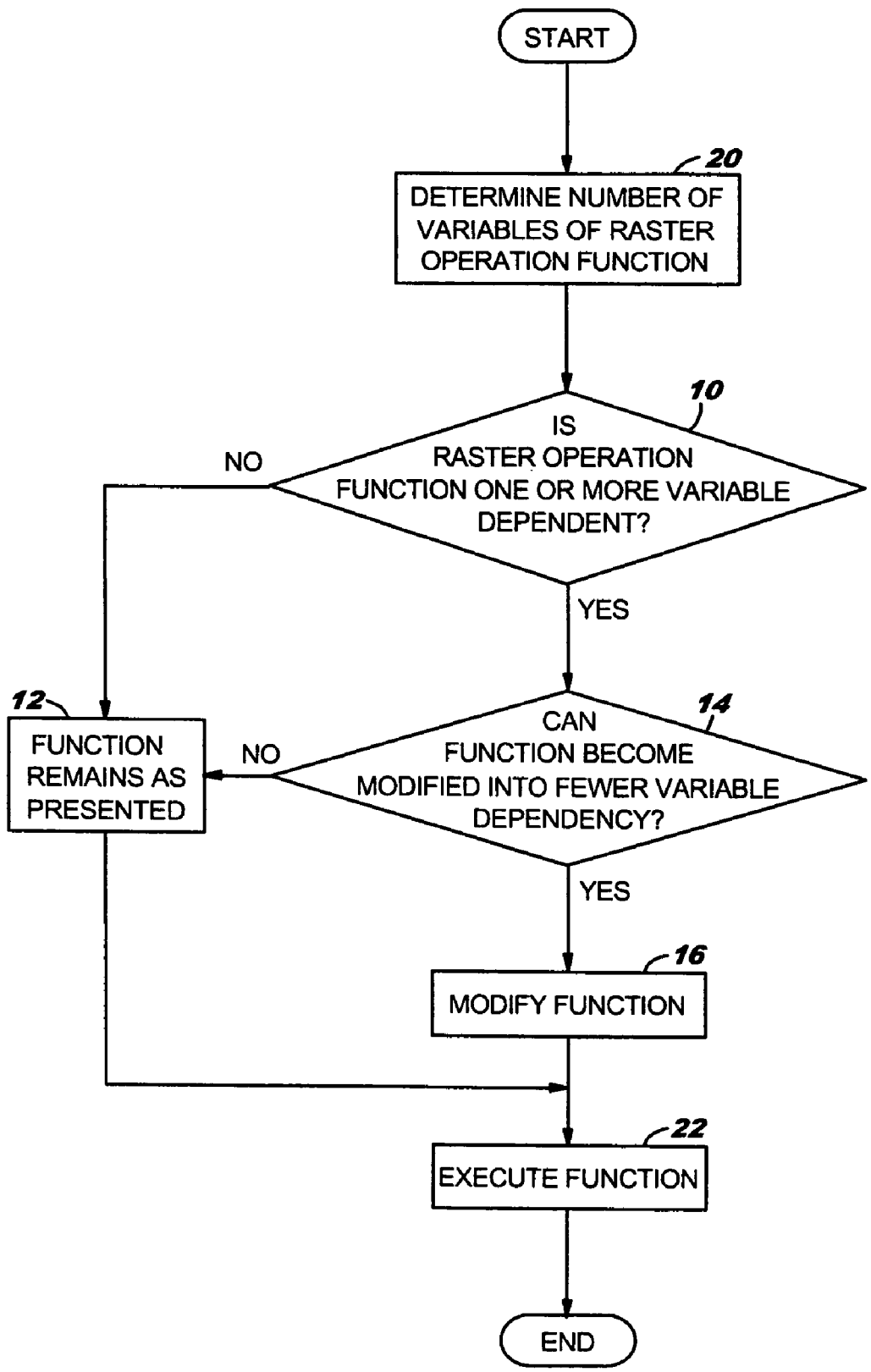
FIG. 2 is an expanded flow chart in accordance with the teachings of the present invention for optimizing a raster operation function if possible.

In general, a raster operation function becomes optimized in accordance with the invention if the function can have its variable dependency reduced. In one embodiment, FIG. 1, optimizing a raster operation function begins by assessing whether the function is one or more variable dependent, step 10. If not, the function remains as presented or specified by the PDL, for example, step 12. If so, if the function can then become modified into fewer variable dependencies, step 14, it is so modified at step 16. In FIG. 2, this process can be preceded with a determination of the actual number of variables of the raster operation function, step 20, and can be followed at step 22 with the processing of the print job through execution of the raster operation function so modified at step 16.

In either instance, raster operation function optimization, by reducing variable dependency, includes the following representative examples whereby an original function specified with a given number of variables becomes modified into fewer variable dependencies and such is recited as the outcome of the expression. Although the following examples typify a multiple-variable raster operation function modified into a single or zero variable function, the invention is not so limited and embraces all embodiments whereby functions are modified into fewer variable dependency. As a preliminary matter, however, the raster operation functions in the examples are presented as a function F(D, S, P) on a pixel-by-pixel basis of a to-be-printed page, where D is the to-be-printed page or destination variable; S is a to-be-printed object or object variable of the print job, such as a stencil; and P is the ink, coloring or filling variable of the print job relative to the object variable, such as a solid color for filling the boundaries of the stencil S or an image for filling the stencil boundaries.

In further specificity, the object variable corresponds to whether the to-be-printed object of the print job is an image, such as a jpeg, a stencil, such as a rectangle, or a character (a, b, c . . . x, y, z, 0, 1, 2, . . . ). In other embodiments, it could correspond to a group of related objects. It may also include information useful in processing the object such as a region bounding box. The destination variable corresponds to the physical location and geography of the to-be-printed page on which the to-be-printed object will reside. The ink variable corresponds generally to how to "paint" each pixel within the boundaries or region of the object variable. In turn, the painting of each pixel means to blend three colors of the destination variable, the object variable and the ink variable based on a logic function F(D, S, P).

EXAMPLE 1

In a PCL raster operation function ROP 252, the function is the Boolean expression: P or S in a RGB color space. In the event P is a black ink only (0, 0, 0 in RGB), S is the exclusive outcome of the expression and the destination page is exclusively overwritten with S. In the event P is a white ink only (1.0, 1.0, 1.0 in RGB), P is the exclusive outcome of the expression and the destination page is exclusively overwritten with P. In the event P is neither a black nor a white ink, and if S is an all black image, a character or a stencil, then the outcome of the expression is exclusively P.

EXAMPLE 2

In a PCL raster operation function ROP 90, the function is the Boolean expression: P xor D in a RGB color space. If P is a black ink, the outcome of the expression is D. If D is white or unaltered in the to-be-painted area of the to-be-printed page, the outcome of the expression is the invert of P.

EXAMPLE 3

In a PCL raster operation function ROP 136, the function is the Boolean expression: D and S in a RGB color space. If S is an all white image, the outcome of the expression is D. If S is an all black image, the outcome of the expression is to use a black ink on the destination page. If D is white, or unaltered in the to-be-painted area of the to-be-printed page, the outcome of the expression is S.

EXAMPLE 4

In a PCL raster operation function ROP 160, the function is the Boolean expression: D and P in a RGB color space. If P is a black ink, the outcome of the expression is P. If P is a white ink, the outcome of the expression is D. If D is white, or unaltered in the to-be-painted area of the to-be-printed page, the outcome of the expression is P.

EXAMPLE 5

In a PCL raster operation function ROP 184, the function is the Boolean expression: P xor (S and (D xor P)) in a RGB color space. If S is an all white image (1.0, 1.0, 1.0 in RGB), the outcome of the expression is D. If S is an all black image (0, 0, 0 in RGB), a character or a stencil, the outcome of the expression is P. If P is black (0, 0, 0 in RGB) then the outcome of the expression is simplified to S AND D. If P is black (0,0,0 in RGB) and S is white (1.0, 1.0, 1.0 in RGB) the outcome of the expression is exclusively D.

EXAMPLE 6

In a PCL raster operation function ROP 226, the function is the Boolean expression: D xor (S and (P xor D)) in a RGB color space. If S is an all black image, a character or a stencil, the outcome of the expression is D. If S is an all white image, the outcome of the expression is P.

EXAMPLE 7

In a PCL raster operation function ROP 170, the function is the Boolean expression: D in a RGB color space. The outcome of the expression is no processing (NOP) required.

EXAMPLE 8

In a PCL raster operation function ROP 0 or ROP 255, the function is to paint zero (black) on the destination page or paint one (white), respectively. Thus, the function need not become modified and can remain as originally specified by the print job in accordance with step 12 (FIG. 1).

EXAMPLE 9

In a PCL raster operation function of "logical or," "logical and" or "logical exclusive or" the incoming ink value or variable P onto the destination page, if the incoming ink variable is black (0, 0, 0 in RGB) for the "logical or" and "logical exclusive or" function, the outcome of the function is no processing (NOP) required. If the incoming ink variable is white (1.0, 1.0, 1.0 in R,G,B) for the "logical and," the outcome of the function is NOP. If the incoming ink variable is white (1.0, 1.0, 1.0 in R,G,B) for the "logical or," the outcome of the function is white. If the incoming ink variable is white (1.0, 1.0, 1.0 in R,G,B) for the "logical exclusive or," the outcome of the function is the inverse of the other variable.

Figure 3:
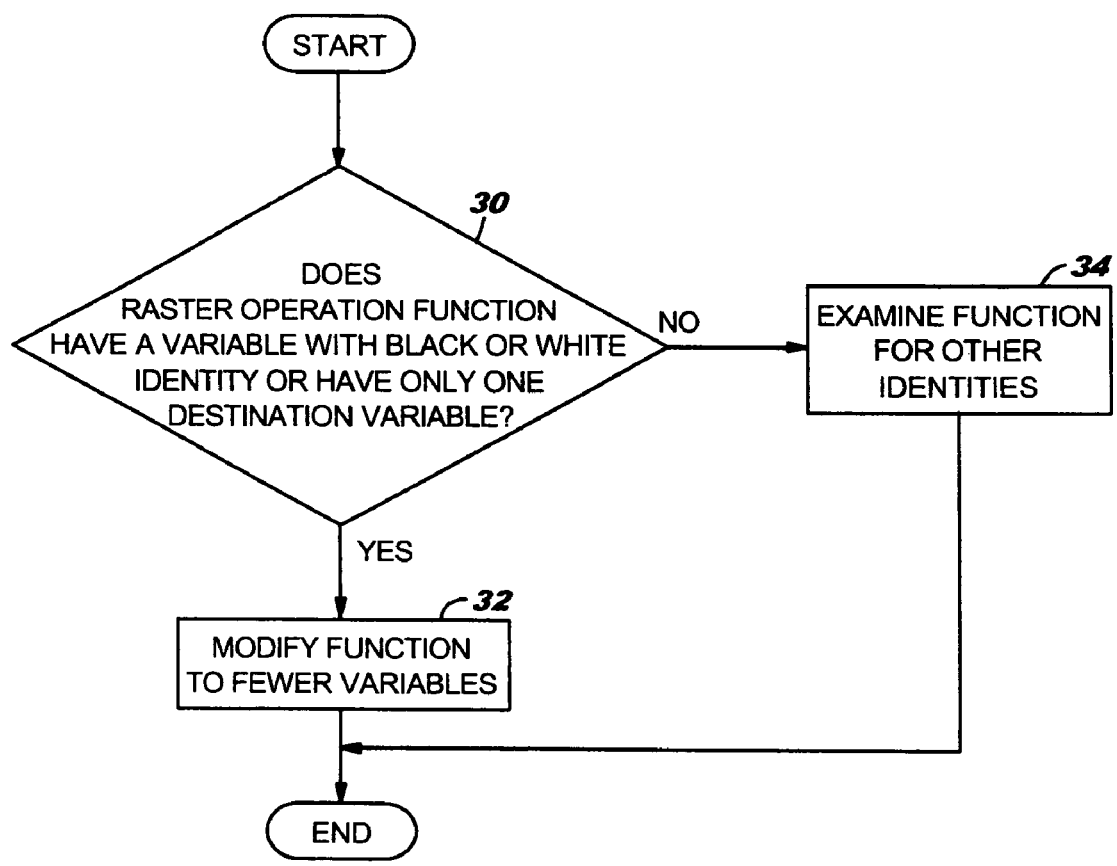
FIG. 3 is a flow chart in accordance with the teachings of the present invention for optimizing a raster operation function if a variable has a certain identity or a variable has only one destination variable.
Figure 4:
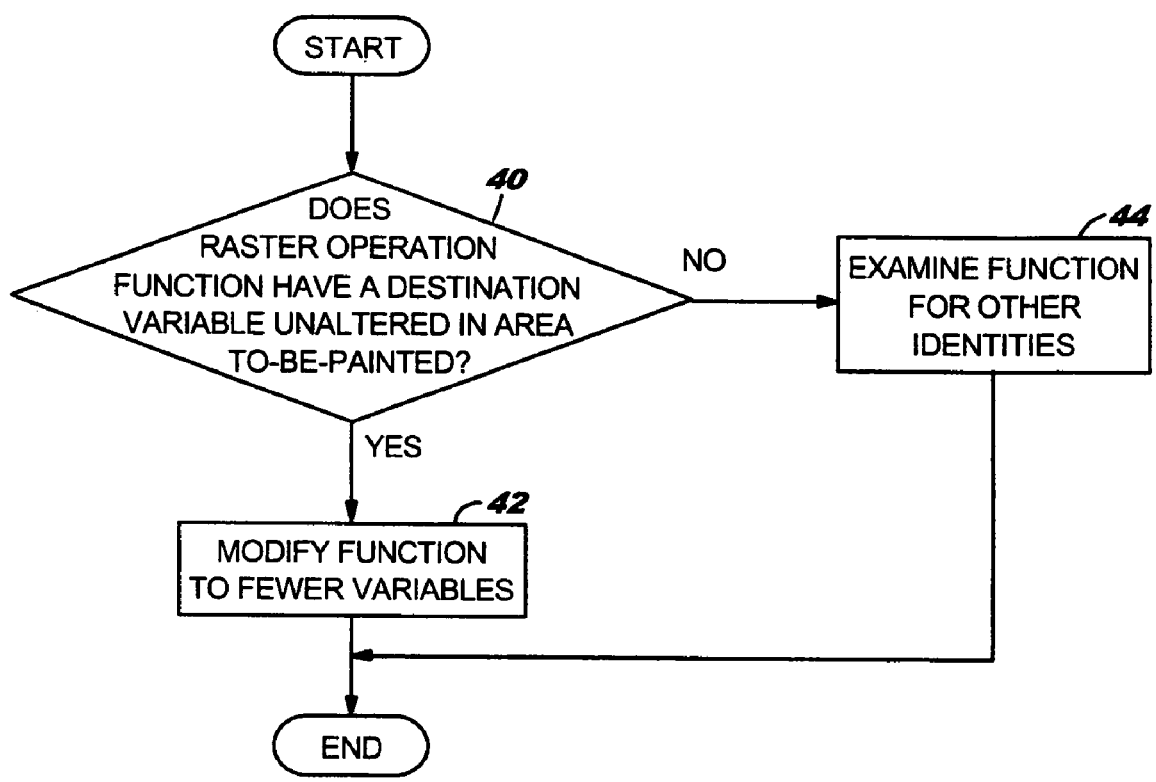
FIG. 4 is a flow chart in accordance with the teachings of the present invention for optimizing a raster operation function if a destination variable has a certain identity.

Appreciating that, in many of the foregoing examples, black and white identities of the variables of the raster operation function allow the function to become modified into a fewer number of variables, the flow chart of FIG. 3 exemplarily shows modification of a function by examining black or white identities of the variables. Preferably, a black or white identity refers to black or white ink variable or a black or white object variable such as a black or white image, stencil or character. At step 30, if a variable of the function has a black or white identity, the function becomes modified into fewer variables, step 32. If no variable has a black or white identity, the function becomes examined for other identities lending themselves to the possible modification or optimization of the function, step 34. In FIG. 4, one such other identity to be examined is whether the destination variable remains unaltered in a to-be-painted area of the to-be-printed page, step 40. If so, the function becomes modified to have fewer variables, step 42. If not, the function becomes examined for still other identities lending themselves to the possible modification or optimization of the function, step 44. Of course, the determination, of whether the function variables have a black or white identity or a destination variable only (step 30) or whether the function has a destination variable unaltered in a to-be-painted area (step 40), can occur in any order or substantially simultaneously. Skilled artisans can also envision other identities of the variables of the raster operation function that will allow the modification of the function into a fewer variable dependency.

Figure 5:
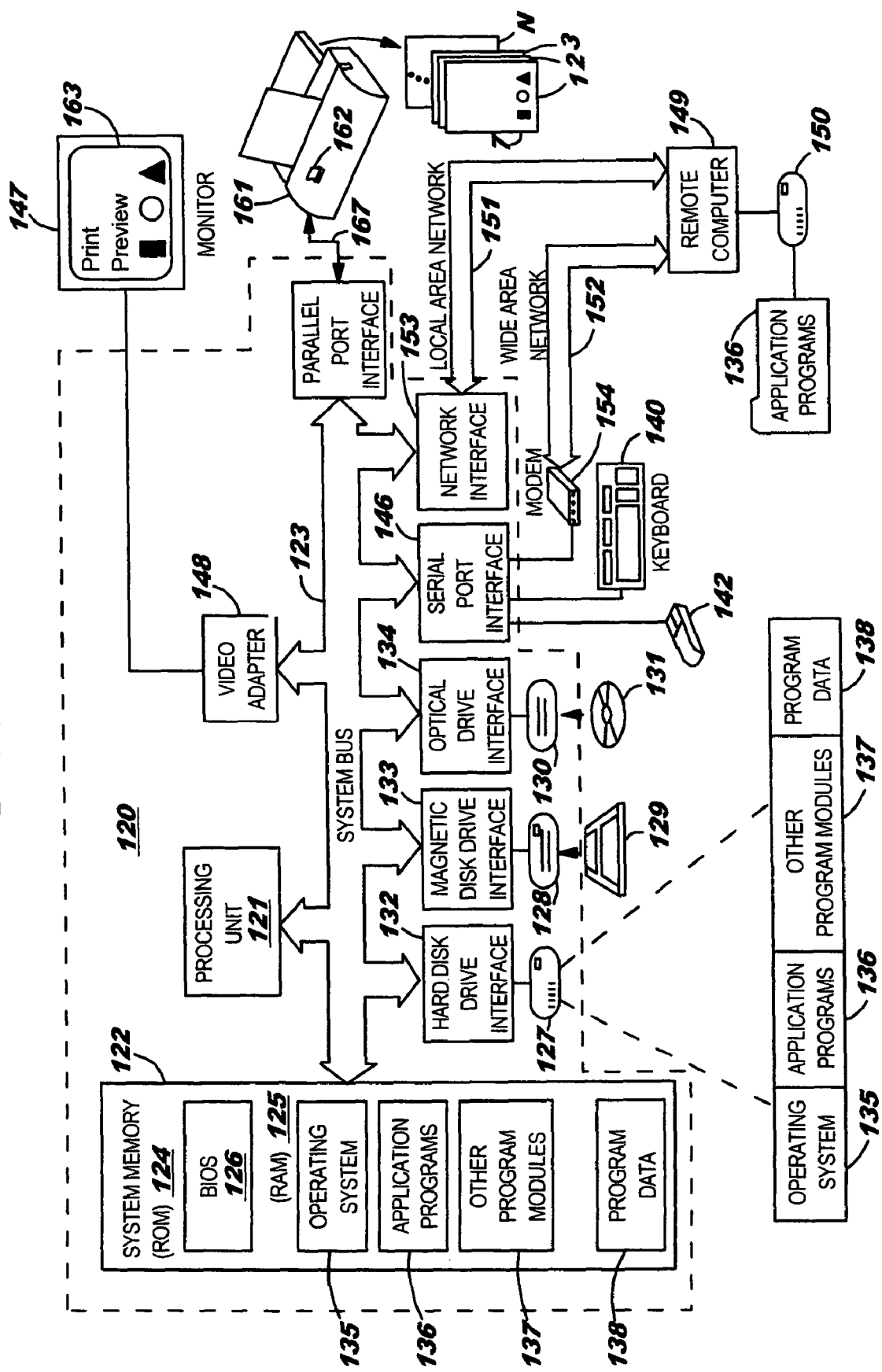
FIG. 5 is a diagrammatic view in accordance with the teachings of the present invention of a representative operating environment in which the invention may be practiced.

Appreciating users of the invention will likely accomplish some aspect of the methods in a computing system environment, FIG. 5 and the following discussion are intended to provide a brief, general description of a suitable computing environment in which either the structure or processing of embodiments may be implemented. Since the following may be computer implemented, particular embodiments may range from computer executable instructions as part of computer readable media to hardware used in any or all of the following depicted structures. Implementation may additionally be combinations of hardware and computer executable instructions. Further, implementation may occur in an environment not having the following computing system environment so the invention is only limited by the appended claims and their equivalents.

When described in the context of computer readable media having computer executable instructions stored thereon, it is denoted that the instructions include program modules, routines, programs, objects, components, data structures, patterns, trigger mechanisms, signal initiators, etc. that perform particular tasks or implement particular abstract data types upon or within various structures of the computing environment. Executable instructions exemplarily comprise instructions and data which cause a general purpose computer, special purpose computer, or special or general purpose processing device to perform a certain function or group of functions.

The computer readable media can be any available media which can be accessed by a general purpose or special purpose computer or device. By way of example, and not limitation, such computer readable media can comprise RAM, ROM, EEPROM, CD-ROM or other optical disk storage devices, magnetic disk storage devices or any other medium which can be used to store the desired executable instructions or data fields and which can then be accessed. Combinations of the above should also be included within the scope of the computer readable media. For brevity, computer readable media having computer executable instructions may sometimes be referred to as software or computer software.

With reference to FIG. 5, an exemplary system for implementing the invention includes a general purpose computing device in the form of a conventional computer 120. The computer 120 includes a processing unit 121, a system memory 122, and a system bus 123 that couples various system components including the system memory to the processing unit 121. The system bus 123 may be any of the several types of bus structures including a memory bus or memory controller, a peripheral bus, and a local bus using any of a variety of bus architectures. The system memory includes read only memory (ROM) 124 and a random access memory (RAM) 125. A basic input/output system (BIOS) 126, containing the basic routines that help to transfer information between elements within the computer 120, such as during start-up, may be stored in ROM 124. The computer 120 may also include a magnetic hard disk drive 127, a magnetic disk drive 128 for reading from and writing to removable magnetic disk 129, and an optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the computer 120.

Although the exemplary environment described herein employs a hard disk, a removable magnetic disk 129 and a removable optical disk 131, it should be appreciated by those skilled in the art that other types of computer readable media exist which can store data accessible by a computer, including magnetic cassettes, flash memory cards, digital video disks, removable disks, Bernoulli cartridges, random access memories (RAMs), read only memories (ROM), and the like. Other storage devices are also contemplated as available to the exemplary computing system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general however, the various storage devices may be partitioned into two basic categories. The first category is local storage which contains information that is locally available to the computer system. The second category is remote storage which includes any type of storage device that contains information that is not locally available to a computer system. While the line between the two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

A number of program modules may be stored on the hard disk 127, magnetic disk 129, optical disk 131, ROM 124 or RAM 125, including but not limited to an operating system 135, one or more application programs 136, other program modules 137, and program data 138. Such application programs may include, but are not limited to, word processing programs, drawing programs, games, viewer modules, graphical user interfaces, image processing modules, intelligent systems modules or other known or hereinafter invented programs. A user enters commands and information into the computer 120 through input devices such as keyboard 140 and pointing device 142. Other input devices (not shown) may include a microphone, joy stick, game pad, satellite dish, scanner, camera, personal data assistant, or the like. These and other input devices are often connected to the processing unit 121 through a serial port interface 146 that couples directly to the system bus 123. It may also connect by other interfaces, such as parallel port, game port, firewire or a universal serial bus (USB).

A monitor 147 or other type of display device connects to the system bus 123 via an interface, such as a video adapter 148. In addition to the monitor, computers often include other peripheral output devices, such as speakers (not shown). Other output or rendering devices include printers, such as a laser printer 161, for producing hard copy outputs of sheets 1, 2, 3 . . . N of paper or other media, such as transparencies. In general, the hard copy output appears as a representation of what a user might view in a print preview screen 163 of an original program application displayed on the monitor. In this instance, the hard copy appears as three side-by-side objects, especially a red (interior-filled) vertically oriented rectangle, a green ring with a white interior and a blue (interior-filled) triangle, and all reside in a non-overlapping fashion near a bottom 7 of sheet 1. In one embodiment, the printer 161 connects to the computer or host device by direct connection to the system bus via a cable 167 attached to parallel port interface 165. In other embodiments, it connects via the serial port interface, USB, Ethernet or other. Often times a driver, for installing necessary software on the computer 120 for the computer and printer to interface properly and to provide a suitable user interface with the printer via the monitor, becomes inserted as the optical disk 131, the magnetic disk 129 or can be downloaded via the internet or retrieved from another entity as a file. Some forms of the present invention contemplate the driver as storing computer executable instructions for executing the methods of the present invention.

During use, the computer 120 may operate in a networked environment using logical connections to one or more other computing configurations, such as a remote computer 149. Remote computer 149 may be a personal computer, a server, a router, a network PC, a peer device or other common network node, and typically includes many or all of the elements described above relative to the computer 120, although only a memory storage device 150 having application programs 136 has been illustrated. The logical connections between the computer 120 and the remote computer 149 include a local area network (LAN) 151 and/or a wide area network (WAN) 152 that are presented here by way of example and not limitation. Such networking environments are commonplace in offices with enterprise-wide computer networks, intranets and the Internet, but may also be adapted for use in a mobile environment at multiple fixed or changing locations.

When used in a LAN networking environment, the computer 120 is connected to the local area network 151 through a network interface or adapter 153. When used in a WAN networking environment, the computer 120 typically includes a modem 154, T1 line, satellite or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the local or remote memory storage devices and may be linked to various processing devices for performing certain tasks. It will be appreciated that the network connections shown are exemplary and other means of establishing a communications link between the computers may be used. Moreover, those skilled in the art will appreciate that the invention may be practiced with other computer system configurations, including host devices in the form of hand-held devices, multi-processor systems, microprocessor-based or programmable consumer electronics, network PCs, minicomputers, computer clusters, main frame computers, and the like.

Figure 6:
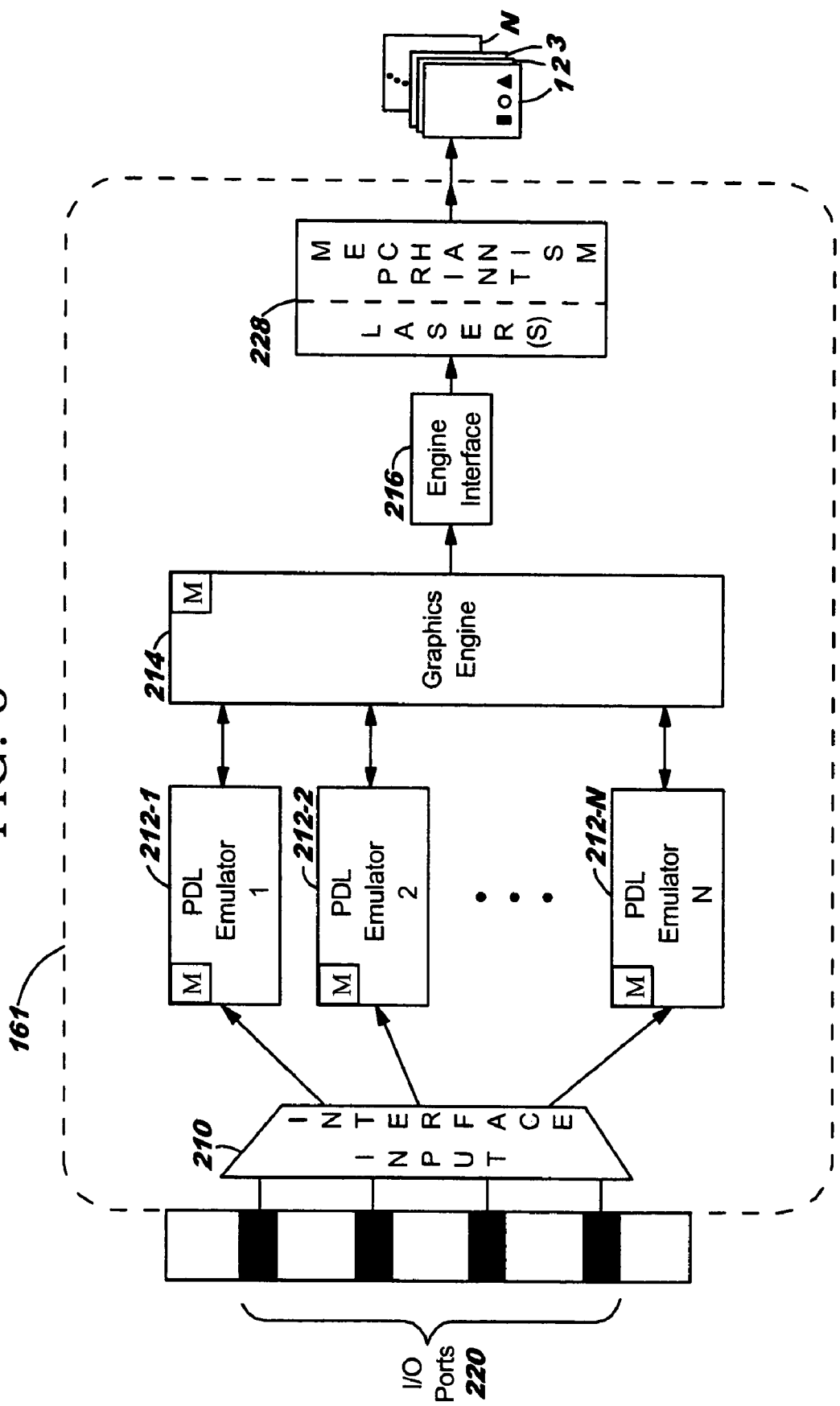
FIG. 6 is a diagrammatic view in accordance with the teachings of the present invention of a rendering device in the form of a laser printer.

With reference to FIG. 6, the rendering device or printer 161 of FIG. 5 is described in more detail. In one embodiment, the printer includes the following functional blocks: an input interface 210; pluralities of PDL emulators 212-1, 212-2 . . . 212-N; a graphics engine 214; an engine interface 216; and print mechanisms 218, including one or more lasers. Of course, the printer has other well known functional components (not shown) to effectuate printing of sheets 1, 2, 3 . . . N, of a print job including a controller often embodied as an ASIC or microprocessor, system memory, buffers, memory card slots/readers, a user-input control panel with discrete buttons and/or software, and the like. Some of these other components may actually be the source of print job. The printer connects to the computer 120 (FIG. 5) via IR, wirelessly, or a cable connected to one of its many input/output (I/O) ports 220. Representative I/O ports include a parallel port, a serial port, a USB port, or a network port, such as Ethernet, LAN, WAN or the like. In addition to or in substitution for the computer 120, the printer can also interface with other host devices. For example, it may interface directly with a digital camera, a personal data assistant, an optical code reader, a scanner, a memory card, or other known or hereafter developed software or apparatus.

During use, as is known, when the host or other device has a print job ready for printing, the host sends data to the printer in a form ready for processing by the printer. Often, this data embodies the well known form of a PDL and includes the raster operation function previously described. Some of the more well known forms of PDLs include Hewlett Packard's printer control language (PCL), PCLXL, Adobe's POSTSCRIPT, Canon's LIPS, IBM's PAGES and IPDS, to name a few. Yet, the printer does not know how many host or other devices are connected to it, on which I/O port(s) they may reside and in what form the PDL print job will arrive. Accordingly, the input interface 210 of the printer performs the following two well known functions. First, it assesses (by looping through the I/O ports) which, if any, of the I/O ports have a print job for the printer and, if a print job exists, locks onto such port. Second, it supplies the print job to the appropriate PDL emulator 212 in accordance with the PDL language type. As shown in FIG. 6, PDL emulators within the printer preferably exist as one emulator per one PDL language type (e.g., one PDL emulator 212-1 for PCL, one PDL emulator 212-2 for POSTSCRIPT, etc.). Downstream, the PDL emulator communicates/interfaces with the graphics engine 214. Generally speaking, the PDL emulator interfaces between the computer and the graphics engine to interpret the language of the PDL file, of any given print job, for the benefit of the graphics engine.

To actually invoke the lasers of the printer or other print mechanisms 218 (including, but not limited to, paper pick mechanisms, rollers, belts, photoconductive members, fusers, sheet feeders, toner cartridges, duplexers, and the like), the graphics engine 214 communicates directly with an engine interface 216. Preferably, the graphics engine supplies a bitmap rendered in device specific color and halftoned. The engine interface, in turn, supplies the requisite information, usually in the form of signals, to the print mechanisms to produce hard copy sheets 1, 2, 3 . . . N, for example.

Figure 7:
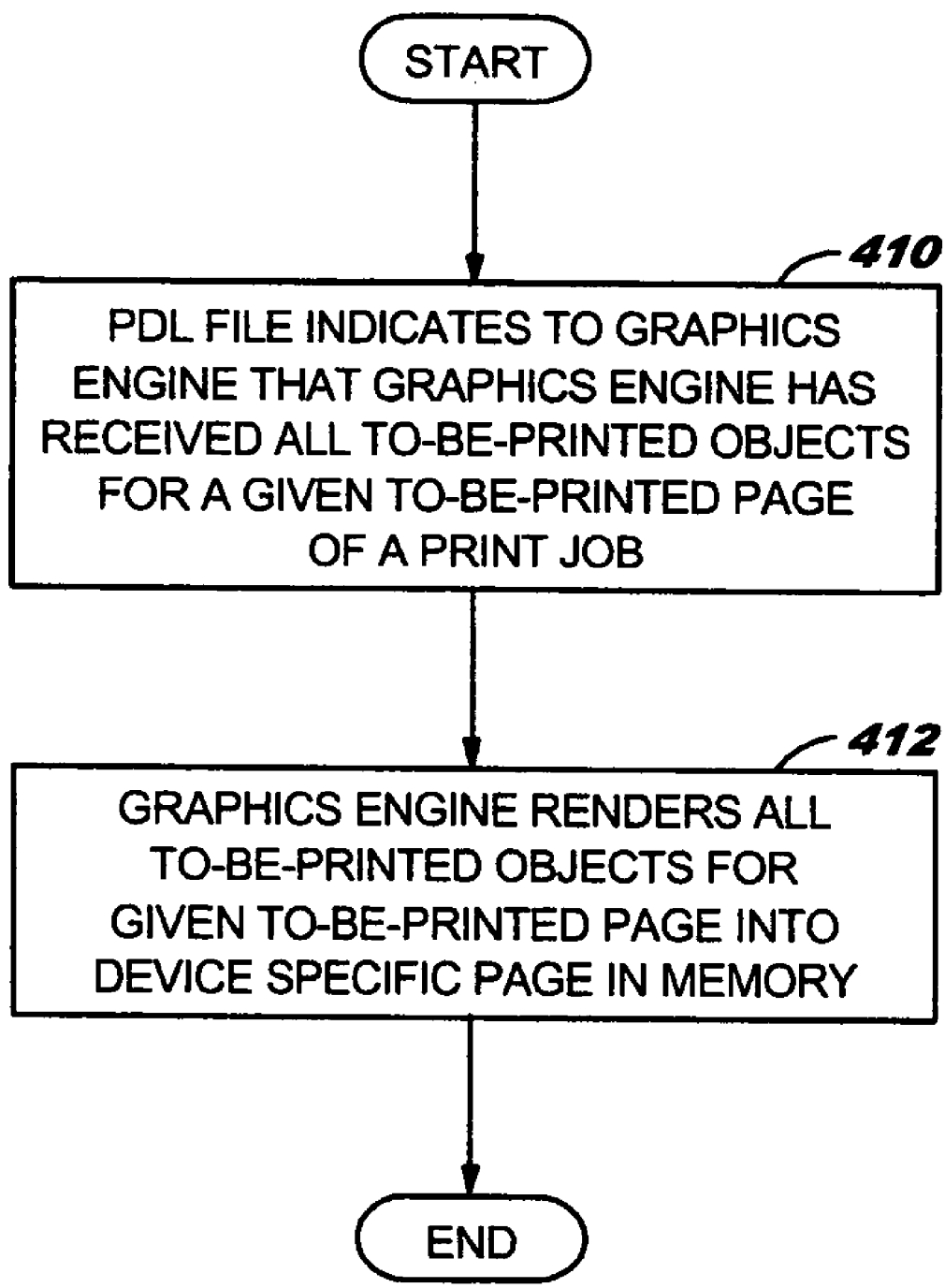
FIG. 7 is a flow chart in accordance with the teachings of the present invention indicating when the graphics engine preferably renders to-be-printed objects for a given to-be-printed page of a print job into device specific pages in memory.

For any given print job, the PDL file (through the PDL emulator) will eventually signal or indicate to the graphics engine that the graphics engine has been presented with or received all to-be-printed objects for a given page of a print job. With reference to FIG. 7, this step 410 then invokes the graphics engine to render all the to-be-printed objects for that given page into a device specific page in memory, step 412. Preferably, this memory corresponds to the graphics engine dedicated memory M but may be any memory, local or remote, the graphics engine has access to. In an alternate embodiment, the rendering of the to-be-printed objects into device specific pages of memory occurs at the completion of receipt of more than one to-be-printed page of the print job or occurs before the completion of receipt of a single to-be-printed page.

In one preferred embodiment, the rendering of to-be-printed objects occurs first by having the graphics engine build, create or otherwise construct a display list having one or more to-be-printed objects for a given to-be-printed page. In essence, the display list comprises pluralities of data structures found in addresses or locations linked in memory that together describe a given to-be-printed object(s) and a to-be-printed page. A display list root begins the display list and points to the first object. The first object then points to the second object and so on until all objects are connected, in memory, for a given to-be-printed page of a print job. Preferably, all object(s) on the display list occur in the same exact order that the PDL file presented them to the graphics engine.

Figure 8:
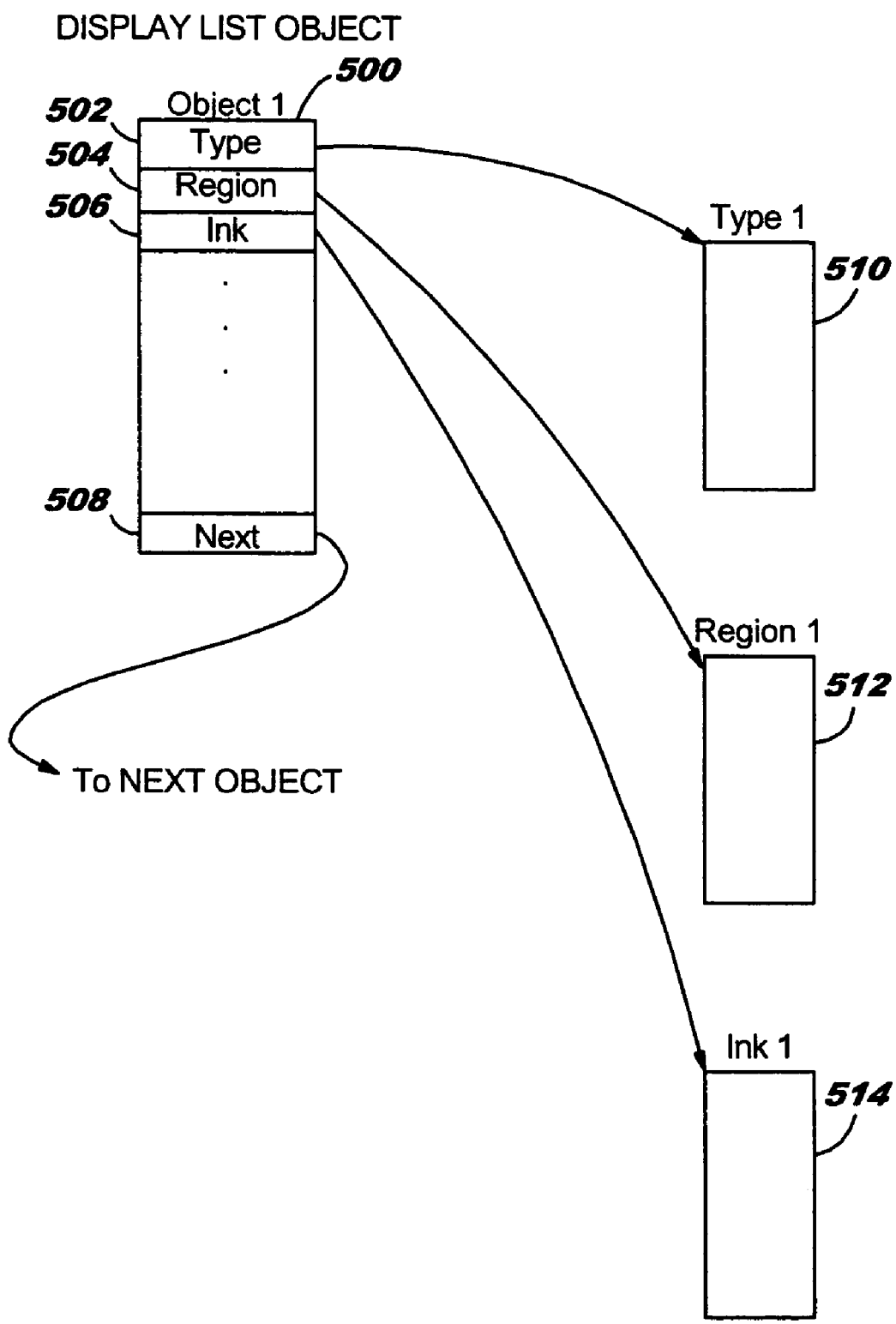
FIG. 8 is a diagrammatic view in accordance with the teachings of the present invention of a display list object.

In more specificity, FIG. 8, a display list object 500 for any given object preferably includes, but is not limited to, the attributes of object type 502, object region 504 and object ink 506. Attributes, as used herein, are typically presented to the graphics engine in accordance with the language type of the PDL. Attributes, however, may also be indirectly influenced by the printer or operator, via the driver or operator panel 162 on the printer 161, for example. A next pointer 508 is also included on the display list object 500 but does not substantively represent an attribute of the object. It merely points to the next object on the display list as will be described later in more detail. The attributes themselves point to specific other memory locations or addresses 510, 512, 514 that more particularly define the object type, the object region and the object ink, respectively.

Figure 9A:
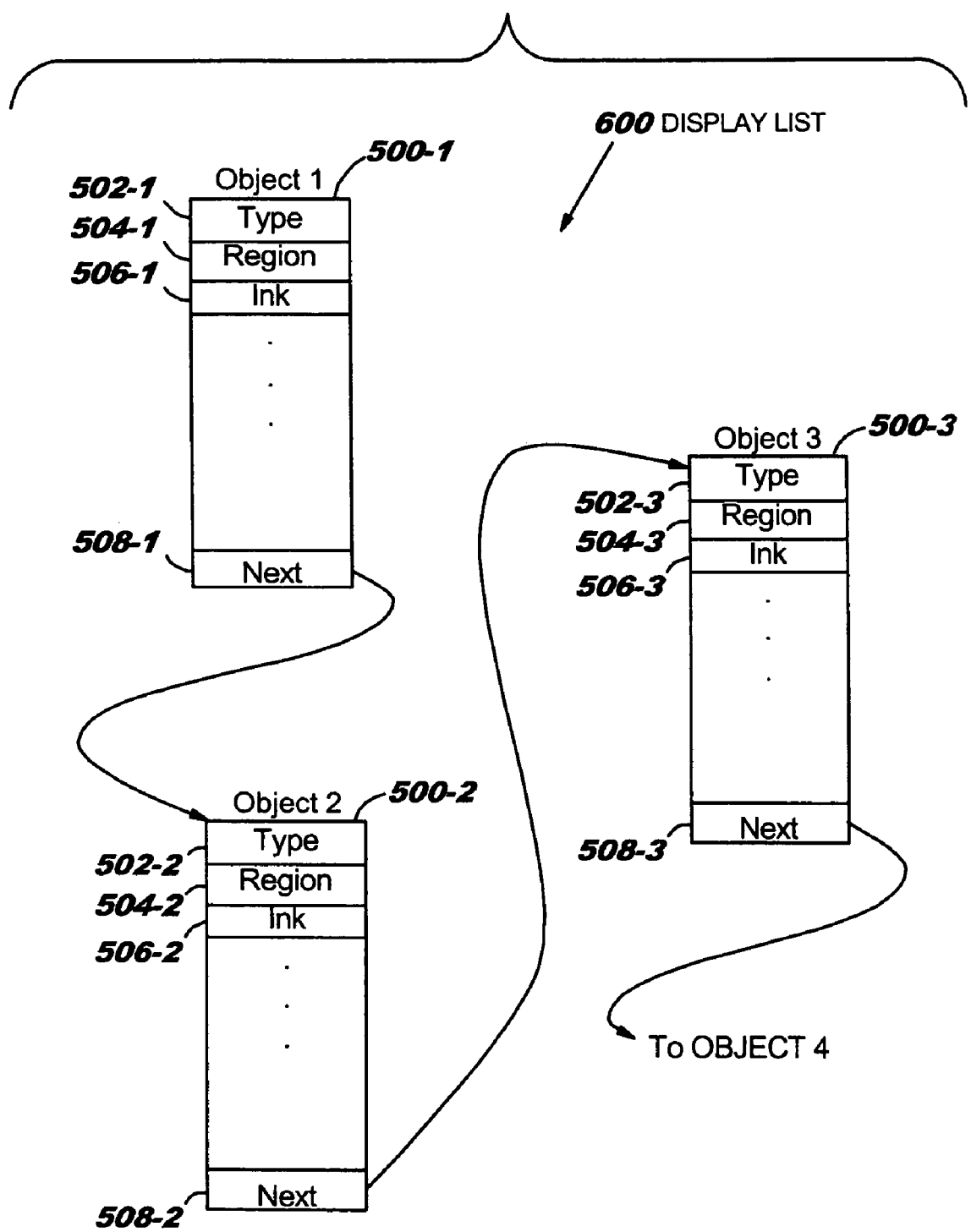
FIG. 9A is a diagrammatic view in accordance with the teachings of the present invention of a display list having pluralities of objects.
Figure 9B:
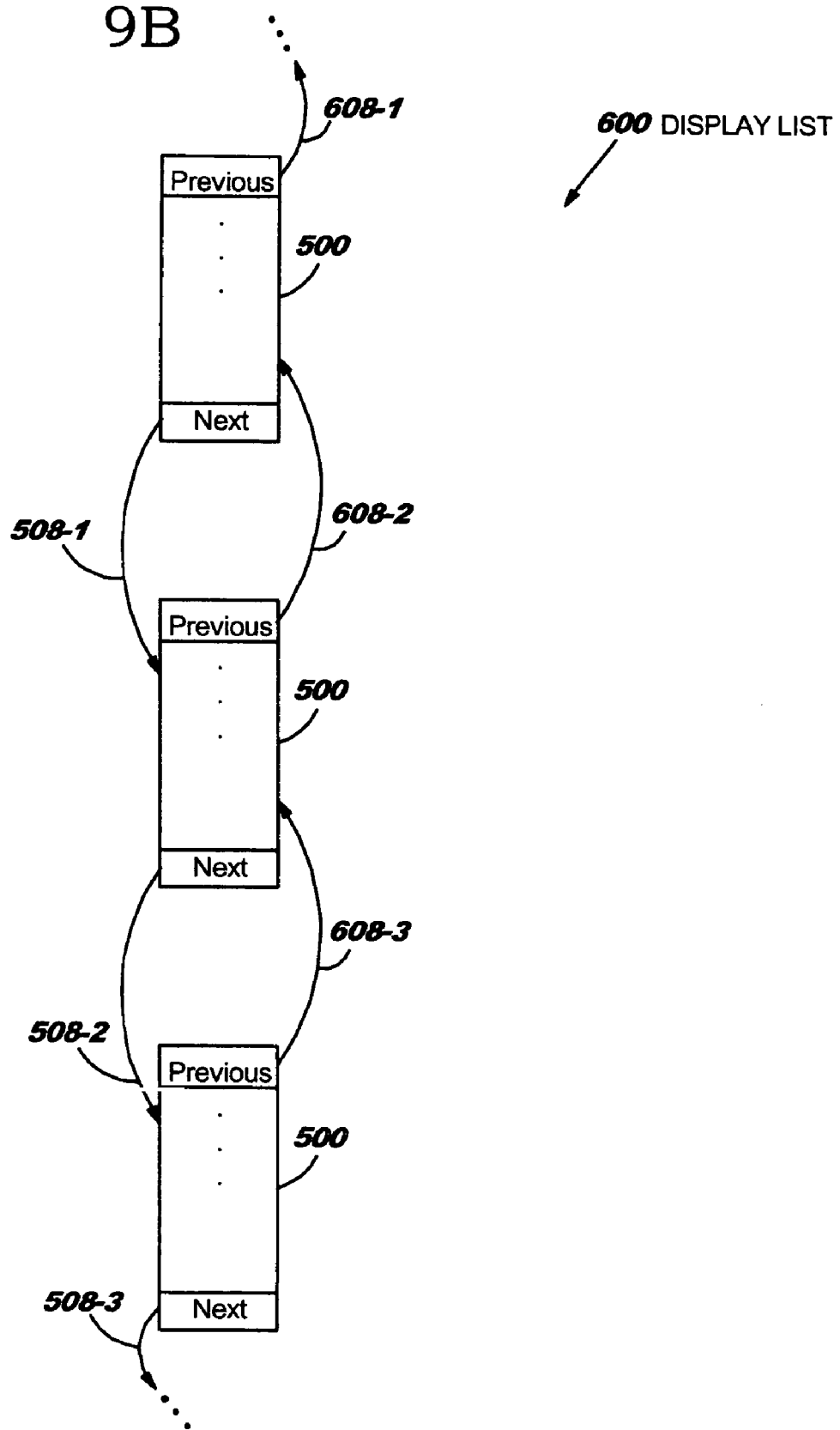
FIG. 9B is a diagrammatic view in accordance with the teachings of the present invention of an alternate embodiment of a display list having pluralities of objects.

In one embodiment, the object type attribute corresponds to whether the to-be-printed object is an image, such as a jpeg, a stencil, such as a rectangle, or a character (a, b, c . . . x, y, z, 0, 1, 2, . . . ). In other embodiments, it could correspond to a group of related objects. The object region attribute corresponds to the physical location of the to-be-printed object on the to-be-printed page and the geography of the object type, such as the pixel dimensions of a rectangular stencil. It may also include information useful in processing the object such as a region bounding box. The object ink attribute corresponds generally to how to "paint" each pixel within the object region. With more specificity, the painting of each pixel means 1) what color to apply to each pixel for that to-be-printed object; and 2) how to apply pixel coloring in instances when pixels of multiple objects overlap one another on the to-be-printed page. In category 2), this typically includes the raster operation function previously described. Although shown in a given order on the display list object 500, the attributes may occur in any order desirable and the actual memory locations representing the attributes of the object need not be contiguous or sequential. With reference to FIG. 9A, a more comprehensive display list 600 is shown with pluralities of display list objects 500-1, 500-2, 500-3 linked together for a given to-be-printed page of a print job via the functionality of the next pointer 508-1, 508-2, 508-3 as previously discussed. In FIG. 9B, the objects (generically 500) of the display list 600 may alternatively be doubly linked via the functionality of both next and previous pointers 608-1, 608-2, 608-3, etc. In still other embodiments, the pointers need not point to immediately preceding or following objects and/or each object 500 may have pointers in addition to those shown. Of course, each object 500 still includes their other attributes and ellipses between the next and previous pointers indicate this feature.

Figure 10:
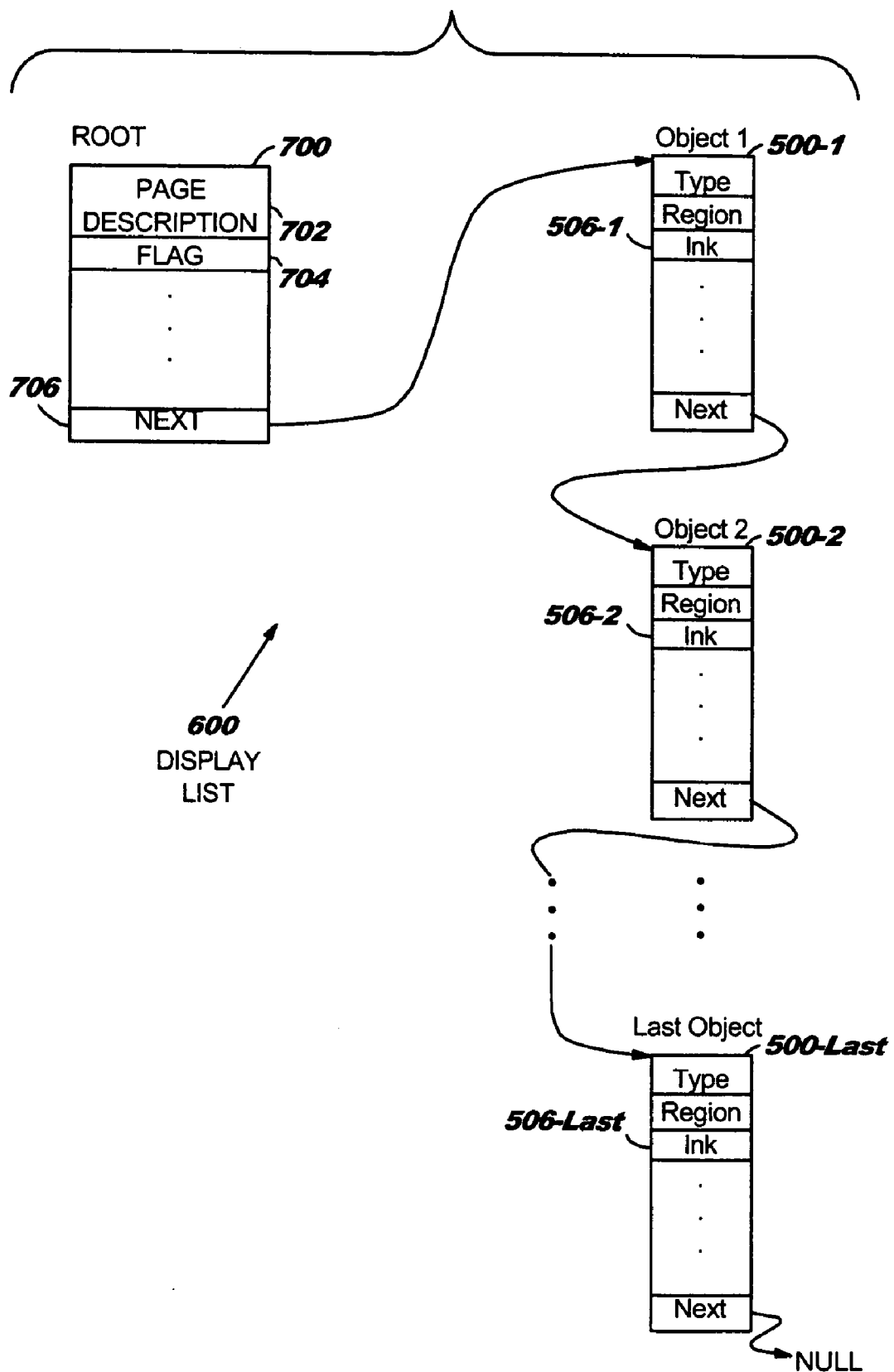
FIG. 10 is a diagrammatic view in accordance with the teachings of the present invention of a display list having pluralities of objects and a root.

With reference to FIG. 10, the display list 600 for a given to-be-printed page may also include a display list root 700 constructed by the graphics engine, and stored in memory, that precedes the first display list object 500-1 and points thereto. In general, the root describes the physical to-be-printed page and the virtual page in memory corresponding thereto. In one embodiment, the root 700 includes attributes for describing this, including a to-be-printed page description attribute 702 and a flag attribute 704. The page description 702 attribute includes information such as the size of the to-be-printed page (e.g., 8.5"×11", A4, etc.), page type (e.g., paper, transparency, glossy, etc.) and the like. It may also contain information specifying the color space in which to-be-printed objects will become blended. The flag 704 attribute becomes set or not (e.g., on or off) for the entirety of the to-be-printed page to indicate whether any of the raster operation functions within the ink attributes 506-1, 506-2, 506-3, etc., of any of the display list objects 500-1, 500-2, 500-3, etc., include a difficult, complex or otherwise "hard" processing operation. If they do, the flag is set. If they do not, the flag is not set. As used herein, a hard processing operation means any raster operation function, previously described, having two or more variables.

As such, the modification of the raster operation function to have a variable dependency less than originally specified by the print job will implicate the setting or not of the flag attribute in a printer having an architecture described above. As is described in more detail in the assignee's (Lexmark International, Inc.) co-pending application entitled "Processing Print Jobs," filed on Mar. 26, 2004, having Ser. No.

10/810,004, and incorporated herein by reference, downstream print job processing occurs down one processing route if the flag is set and down another processing route if the flag is not set. Since processing occurs much more easily without the flag set, being able to modify the raster operation function to have fewer variables, especially less than two, lends tremendous advantage in this type of architecture. This does not mean, however, the invention is only limited to printer architectures of the type having flags set or not.

In an alternate embodiment, the flag 704 attribute can become set or not for the entirety, or a partiality, of the to-be-printed page to indicate any other criterion or criteria such as the presence or absence, the on or off, or meeting of a condition, or not, in any of the display list objects 500. Still alternatively, the flag attribute may become set or not depending upon whether the math or logic function is a Boolean or an algebraic equation in accordance with the popular PCL or PDF languages. In addition, the condition may reside in an attribute of an object other than or in addition to the ink attribute 506. The condition may also appear in the display list root in addition to or in the absence of a condition appearing in one or more of the display list objects.

Hereafter, the graphics engine renders the to-be-printed objects into device specific pages in memory. In one embodiment, this includes the graphics engine ascertaining the object type attribute 502-1 of the to-be-printed object; ascertaining the object region attribute 504-1; and converting the color information, on a pixel-by-pixel basis for that to-be-printed object, into the device specific colors (e.g., CMYK) as previously described. Next, it performs well-known halftone operations for the to-be-printed object so it will appear properly to the human eye when viewed as a hard copy output. Next, the memory addresses or locations corresponding to that object, i.e., the display list object 500-x, are released or freed so that the graphics engine or other structure can use them for future operations as necessary. If additional to-be-printed objects appear on the display list that require rendering, the graphics engine repeats the process until all to-be-printed objects are rendered in memory. At this point, the graphics engine can hand-off the bitmap, in device specific colors and halftoned, directly to the engine interface 216 (FIG. 6) to invoke the print mechanisms 218 of the printer 161 for producing a hard copy sheet. Of course, if additional to-be-printed pages, e.g., 2, 3 . . . N existed in a given print job, the graphics engine could wait until all to-be-printed pages became rendered before executing the hand-off.

Figure 11:
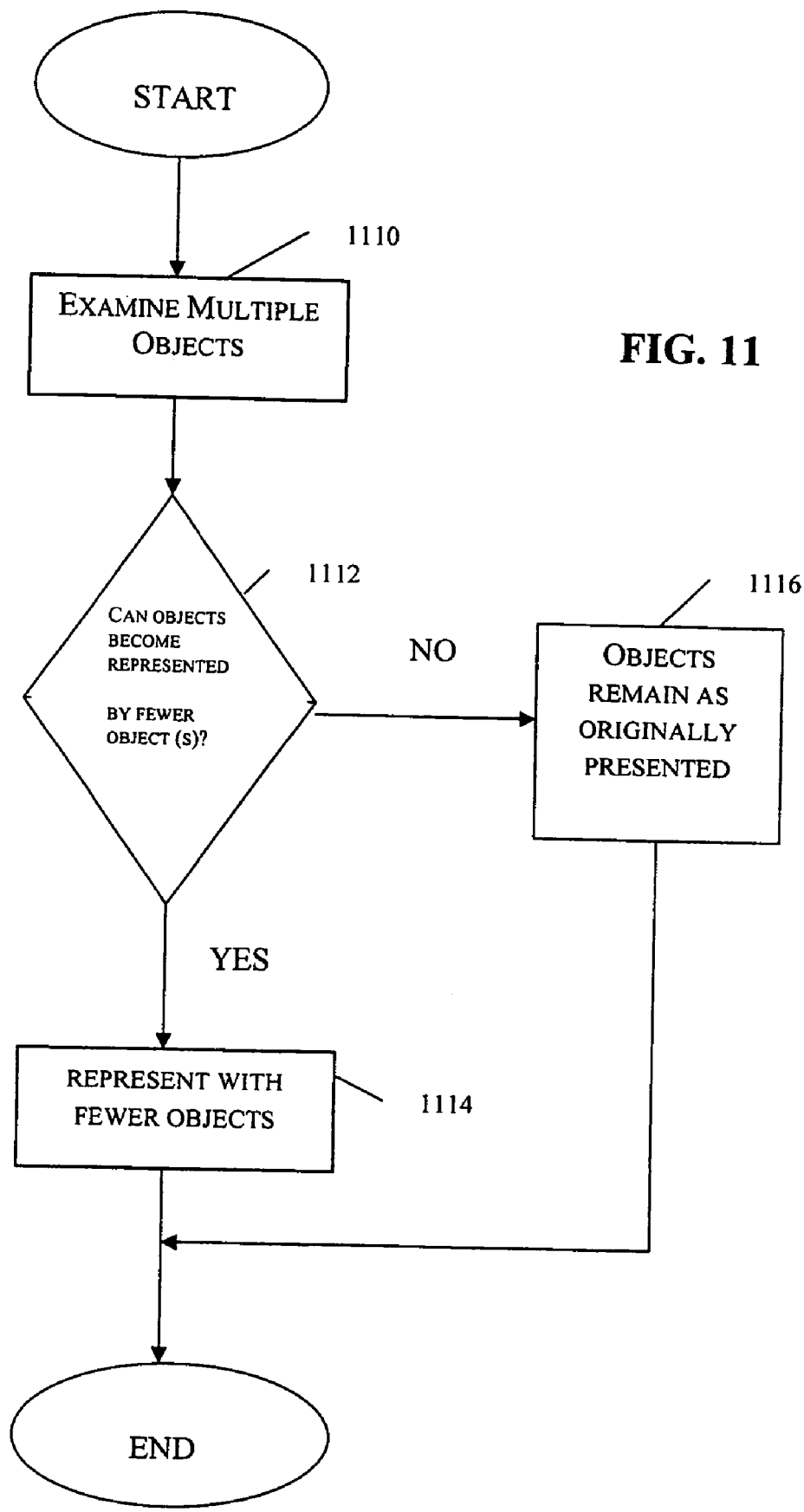
FIG. 11 is a flow chart in accordance with the teachings of the present invention for optimizing multiple objects.

With the foregoing architecture in mind, multiple to-be-printed objects of a print job can appear as consecutive objects (e.g., object 1 500-1, object 2 500-2, object 3 500-3) on a display list 600 (FIG. 9A). To capitalize on commonality amongst the many objects, the invention contemplates minimizing processing and memory requirements by combining common aspects thereof. With reference to FIG. 11, multiple objects are examined at step 1110. In one embodiment, the graphics engine performs this via local or remote examination of memory locations containing data related to the objects. In other embodiments, other processors within the rendering device and/or host device perform it. No matter what structure undertakes the examination, it is preferred that such occurs via the functionality of locally or remotely stored or accessible computer executable instructions. At step 1112, if one or more examined objects can be represented in some fashion by fewer objects, they are so represented at step 1114. As will be described more below, this representation by fewer objects even contemplates representation of multiple objects with a single object or creation of a no processing (NOP) situation between objects when processing would have normally otherwise been expected to occur. In the event multiple objects are unable to be represented by fewer objects, the objects remain as originally presented, step 1116. Processing then occurs according to previously recited methods.

Figure 12:
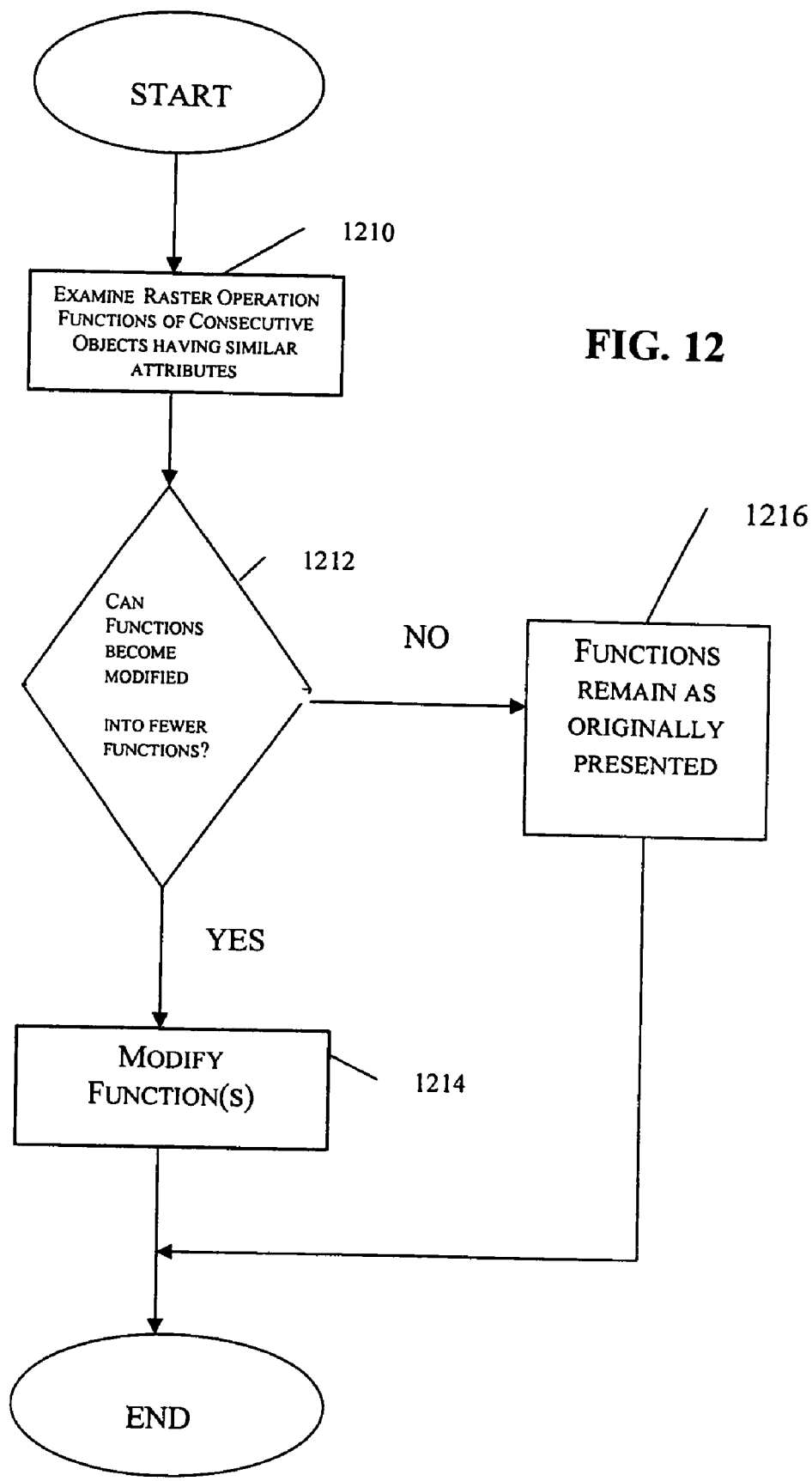
FIG. 12 is a flow chart in accordance with the teachings of the present invention of a representative example for optimizing multiple objects.

With reference to FIG. 12, a specific example of representing multiple objects with fewer objects begins by examining the raster operation functions of consecutive display list objects having similar attributes, step 1210. Similar attributes include, but are not limited to, similar object type, object region or object ink attributes as previously described. In the event attributes are exactly the same, this too qualifies as being "similar." Exact attributes include identical stencils (under the object type attribute), identical inks or identical origins.

At step 1212, if the functions of consecutive objects can be modified into fewer functions, they are so modified, step 1214. In other words, if a smaller number of raster operation functions can accurately describe or represent the multiplicity or entirety of original raster operation functions of consecutive objects with similar attributes, they should be represented in this fashion to make for less burdensome processing and memory usage. As an example, if three consecutive objects each having their own raster operation function can be described or modified according to less than three raster operation functions, the three consecutive objects should then be represented with the less than three functions. Although not required, the less than three functions may exactly embody any one or more of the original raster operation functions of the consecutive objects examined at step 1210. It may also be true that the less than three functions represent an entirely new function not seen in any of the original raster operation functions of the consecutive objects. Specific examples of this will be given below.

Conversely, if the functions of the consecutive objects cannot be reduced into fewer functions, they remain as originally presented, step 1216. Processing then proceeds in a manner previously described or in any other manner.

Naturally, any one of the original raster operation functions of the consecutive objects (step 1210) or the modified function(s) (step 1214) can be optimized by reducing their variable dependency as described with reference to FIGS. 1-4. The timing for effectuating the reduction in variable dependency can occur whenever. In one instance, it occurs before the examination of consecutive objects at step 1210. In another instance, it occurs after the modification of functions at step 1214. It can even occur at any time in between. Also, this concept applies equally to the examples in the following figures as it does to the generic representation of representing multiple objects with fewer such object(s) at step 1114.

Figure 13:
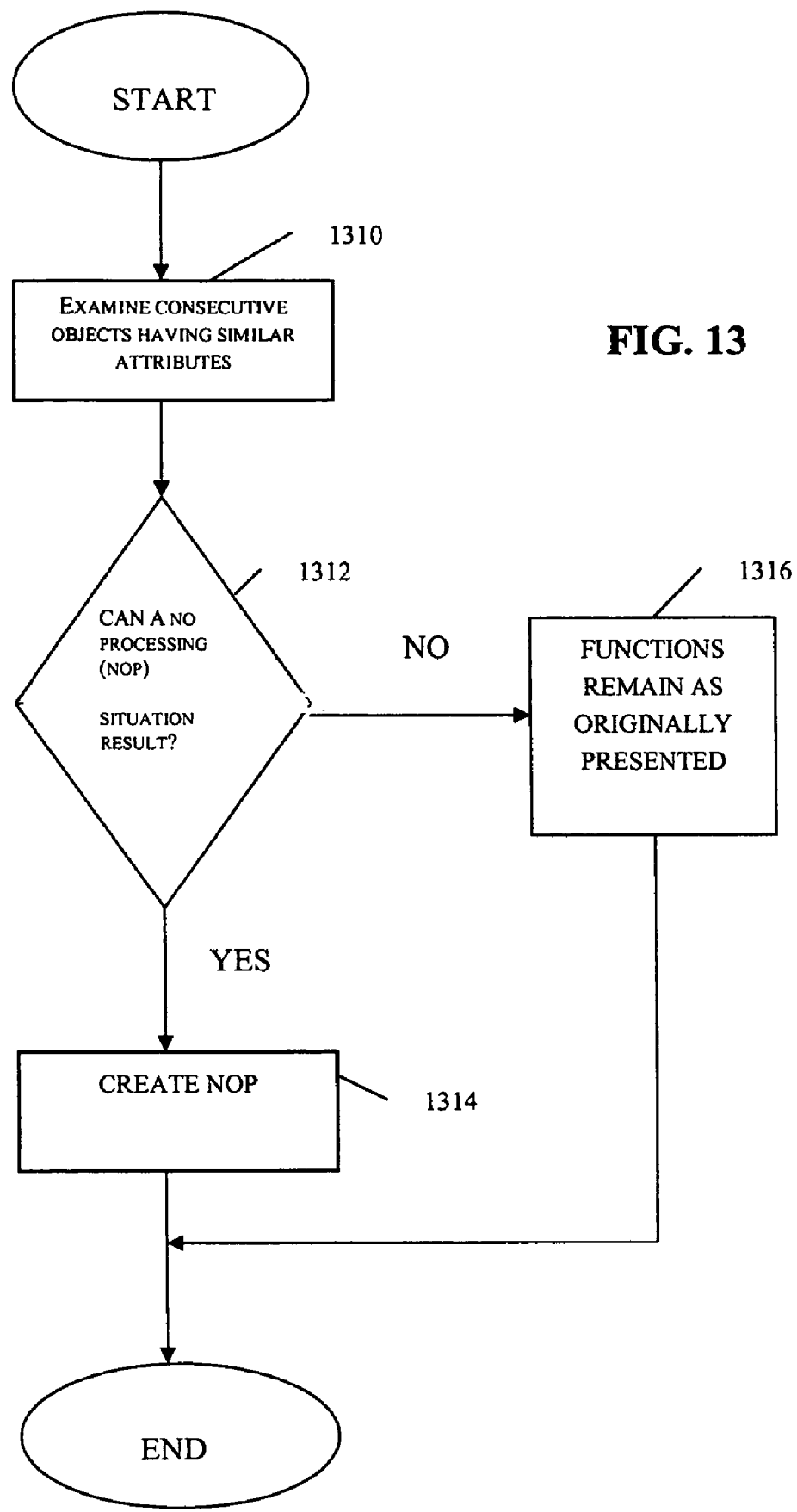
FIG. 13 is a flow chart in accordance with the teachings of the present invention of another representative example for optimizing multiple objects.

With reference to FIG. 13, consecutive objects having similar attributes are again examined at step 1310. At step 1312, in the event a NOP situation can result between objects otherwise specified by the PDL print job to be processed, the NOP is so created at step 1314. In this manner, the ultimate processing of print jobs is greatly simplified. An example of this will be given below. On the other hand, if the NOP cannot be created, the functions of the consecutive objects remain as originally presented, step 1316. Normal processing then ensues.

Figure 14:
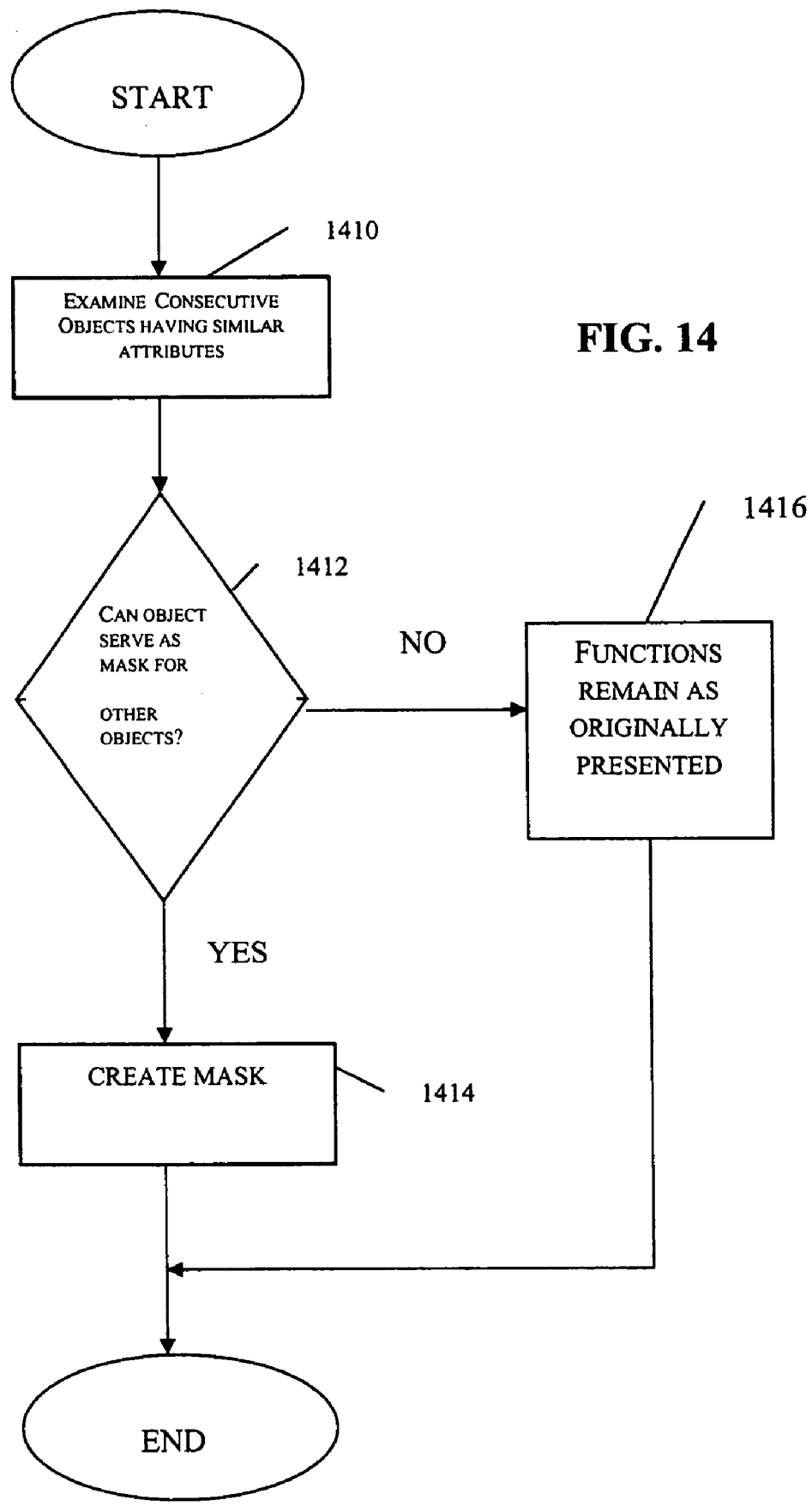
FIG. 14 is a flow chart in accordance with the teachings of the present invention of still another representative example for optimizing multiple objects.

With reference to FIG. 14, consecutive objects having similar attributes are again examined at step 1410. At step 1412, if one or more of the consecutive objects can effectively serve as a mask for one or more of the other consecutive objects, the mask is so created at step 1414. If not, the functions or objects remain as originally presented, step 1416. Other processing then ensues. An example of mask creation is given below.

EXAMPLE 10

Three consecutive objects appear on a display list and each has a stencil S and origin (the place on the page where the object is to be placed). In PCL raster operation parlance, the first object has a ROP of 240 (P), the second object has a ROP of 160 (D and P) and the third object has a ROP of 90 (D exclusive or (xor) P). The first and third objects have ink P with the same color space but the intensities, e.g., the grey values associated with each color plane, are the inverse of one another. (An example of inverse intensities is as follows: if the first object has RGB values of 1, 1, 1, then the third object has RGB values of 254, 254, 254. In other words, the grey value of the first object added to the grey value of the third object should equal 255 for any given color plane.) The second object has ink P as an image or a pattern fill (sometimes called a tiled image) and has colors of only black and white. Because of the ROP 160 and ROP 90 objects, typically it would be required to perform processing in a manner with a flag set for hard processing operations as previously described. However, these three objects can be simplified to just the second object having colors of the third object to replace the black of the second object and using a ROP of 240. After doing this, no hard processing is required and the print job is simplified.

The second object can represent its white and black colors in one of several ways. In one instance, a 1 bit per pixel (bpp) mono direct image is utilized. In another, a 1 bpp lookup table mono image is used where the lookup table has values of black and white. Another possibility is to have an 8 bpp RGB direct image whose values are only black and white. Other potential combinations are also legal (varying color space or bit depth). Naturally, the color space and bit depth used does not need to match that used by the first or third objects.

EXAMPLE 11

Two consecutive objects appear on a display list and have identical stencils and origins. If both objects also have a ROP of 90 (D xor P) and equivalent ink and intensity values, they will result in a NOP. Without creating a NOP, these two objects would otherwise need processing according to hard processing operations, as previously described. However, by performing this optimization, no such hard processing operation is required. In practice, it is not necessary to create a new object with a NOP code. Rather, these two consecutive objects can just be removed, in their entirety, from the display list.

EXAMPLE 12

Three consecutive objects appear on a display list and have identical stencils and origins. The first object has a ROP of 90 (D xor P), the second object has a ROP of 160 (D and P), and the third object has a ROP of 90 (D xor P). The first and third objects have the same color space and same intensities. The second object is an image or a pattern fill (tiled image) and has colors of only black and white. Typically it would be required to perform processing according to hard processing operations, as previously described.

However, these three objects can be simplified to a single object using the same image specified by the second object as a mask. For each black pixel in the second object image, make the color that of the color of either the first or third object (they are the same). For each white pixel in the second object image, mask the color of the third object to xor with the color of the destination D. Effectively, the image specified by the second object then becomes like a mask. After this optimization, no hard processing operation processing is required.

EXAMPLE 13

Three consecutive objects appear on a display list as with Example 10. The second object (ROP 160), however, has black and white colors in any color space, any bit depth and is either a direct image or indirect image (sometimes also called an indexed image). As skilled artisans understand, a direct image is one in which the image data contains the grey values to be used on each plane. For example, if the image is in the RGB color space, the image would have three planes of associated data each representing the grey values for the R, G and B. An indirect image is one where even if the color space of the image requires multiple planes of data, the image is represented by a single plane of data along with a buffer containing the actual grey values to use per plane. If the indexed image data is 8 bits, then no more than 256 colors can be represented. The image data acts as an index thru the buffer holding the grey values. Thus, getting the actual grey values is an indirect operation (or indexed operation). Additionally, the second object does not need to specify the same color space as the first or third object. Provided the second object has a shape (e.g., stencil) of any dimension fully contained within the first and third objects, optimization occurs, like that of Example 10.

EXAMPLE 14

This example is the same as Example 10, except that the second object can have its ROP embodied as ROP 136 (D and S) and the third object can have its ROP embodied as ROP 102 (D xor S). These three objects can be simplified to just the third object with ROP 240.

EXAMPLE 15

This example is the same as Example 11, except the ROP's of the first and second objects are ROP 102 (D xor S).

EXAMPLE 16

This example is the same as Example 12, except the ROP's of the first and third objects are ROP 102 (D xor S) and the second object has a ROP 136 (D and S).

In all, the foregoing examples generically represent algorithms selected to identify multiple objects having properties such that they can be simplified to a fewer number of objects having simpler processing requirements (e.g., no hard processing requirements).

In general, it is known to have either host based control of printing or to have device or printer based control of printing. Heretofore, printer based control has been exclusively described. In an alternate embodiment, however, the foregoing could be implemented through host-based control wherein the printer driver, installed on the host from some sort of software media, e.g., optical disk 131 (FIG. 5), alone or in combination with the computer 120, could perform the above-described processing through the implementation of computer-executable instructions on the driver or elsewhere. In still another embodiment, although the foregoing has been described in relationship to a laser printer, e.g., 161, no reason exists why this could not extend to inkjet printers, fax machines, copy machines, monitors, or other output-type rendering devices that provide output renditions for a given input.

The present invention has been particularly shown and described with respect to certain preferred embodiment(s). However, it will be readily apparent to those skilled in the art that a wide variety of alternate embodiments, adaptations or variations of the preferred embodiment(s), and/or equivalent embodiments may be made without departing from the intended scope of the present invention as set forth in the appended claims. Accordingly, the present invention is not limited except as by the appended claims.

What is claimed:

1. A method for processing a print job, comprising
receiving a print job, the print job specifying raster operation functions for applying pixel coloring for a plurality of to-be-printed objects; and
creating a rasterized page image corresponding to the print job, comprising representing a plurality of the to-be-printed objects with fewer said objects.

2. The method of claim 1, wherein the creating comprises modifying the plurality of raster operation functions corresponding to said plurality of to-be-printed objects into fewer said functions.

3. The method of claim 1, wherein the creating comprises creating a no processing situation between one or more of said plurality of to-be-printed objects.

4. The method of claim 1, wherein the creating comprises creating a mask for one or more of said plurality of to-be-printed objects.

5. The method of claim 1, wherein the creating comprises examining consecutive objects of said plurality of to-be-printed objects, said consecutive objects existing on a display list, the display list comprising a plurality of data structures found in locations linked in memory that together describe the to-be-printed objects.

6. The method of claim 1, wherein the rasterized image comprises a bitmap.

7. The method of claim 1, wherein the representing comprises utilizing one of the raster operation functions for one of the to-be-printed objects as representative for more than the one of the to-be-printed objects.

8. A non transitory computer readable media storing a computer executable instructions for performing the steps recited in claim 1.

9. A printer having a graphics engine with locally or remotely accessible computer executable instructions for performing the step recited in claim 1.

10. A method for processing a print job, comprising:
receiving a print job, the print job specifying raster operation functions for applying pixel coloring for a plurality of to-be-printed objects; and
creating a rasterized page image corresponding to the print job, comprising reducing a plurality of the raster operation functions corresponding to the plurality of to-be-printed objects to fewer said raster operation functions.

11. The method of claim 10, wherein the reducing comprises modifying any of the raster operation functions to have fewer variables than originally specified by said print job.

12. The method of claim 10, wherein the creating comprises examining consecutive objects of said plurality of to-be-printed objects, said consecutive objects existing on a display list and having similar attributes.

13. The method of claim 10, wherein the rasterized image comprises a bitmap corresponding to the print job.

14. The method of claim 10, wherein the reducing comprises utilizing one of the raster operation functions for a first of the to-be-printed objects as representative for more than the first of the to-be-printed objects.

* * * * *